Jan. 12, 1954     J. A. KANUCH     2,665,704
CONSTANT SPEED FLOW CONTROL VALVE
Filed March 26, 1948     2 Sheets-Sheet 1
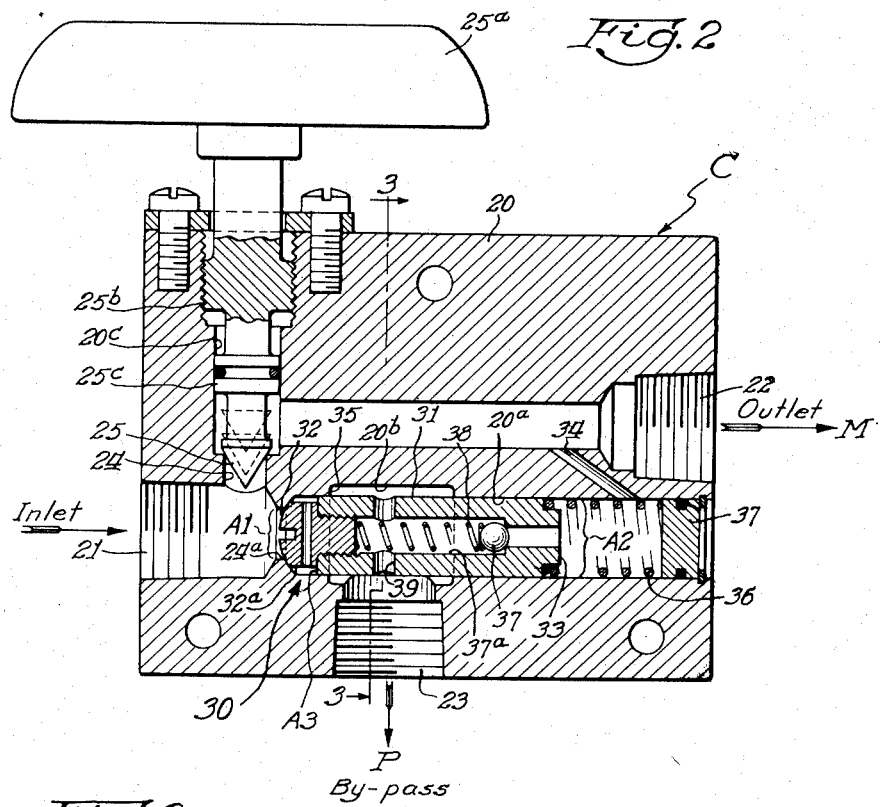
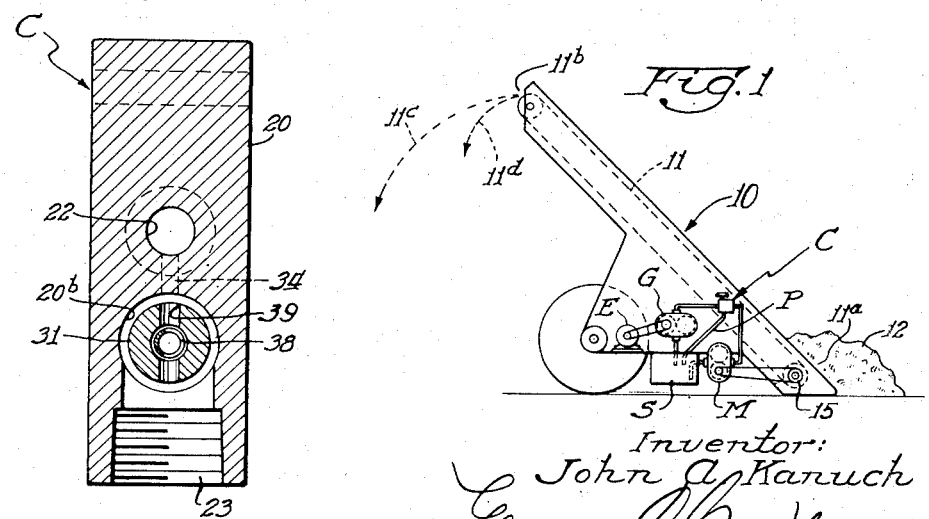
Inventor:
John A. Kanuch Patented Jan. 12, 1954

2,665,704

UNITED STATES PATENT OFFICE 2,665,704

CONSTANT SPEED FLOW CONTROL VALVE

John A. Kanuch, Cleveland, Ohio, assignor to Borg-Warner Corporation, Chicago, Ill., a corporation of Illinois Application March 26, 1948, Serial No. 17,177

7 Claims. (Cl. 137—110).

This invention relates to liquid pressure power units and particularly to control arrangements therefor effective to maintain a predetermined speed of operation of a driven element irrespective of variations in the load resistance offered said driven element, within the load capacity range thereof.

Proposals have been made heretofore in an effort to solve the present problem of efficiently and effectively predetermining the speed of rotation of a hydraulic motor notwithstanding variations in the load resistance; however, the arrangement herein disclosed is believed to present a novel and important solution to this problem.

Referring by way of example to the problem presented in the driving of an endless conveyor, it has been found that with known arrangements any considerable variations in the weight of material being moved by the conveyor results in a corresponding change in the speed thereof and hence a change in the discharge trajectory. It is desirable that the trajectory be maintained the same or changed at will to conform with a predetermined pattern as when filling a coal truck or coal bin.

Therefore, it is an object of the present invention to provide in an arrangement including a liquid pressure generator and liquid pressure responsive motor, means effective automatically to predetermine the speed of rotation of the motor irrespective of variations in the load being driven by said motor, within the capacity range.

It is a further object to provide in a power unit including a constantly driven liquid pressure generator, a rotating type of liquid pressure responsive motor, adapted to drive a load the resistance of which is subject to variations and pressure responsive valve control means effective to automatically maintain the same speed of rotation of said motor irrespective of said load variations.

It is a more particular object to provide in an arrangement of the above character, pressure responsive control valve means effective upon the occurrence of changes in the differential of pressure across a flow orifice to adjust the rate of delivery of liquid pressure to the motor, resulting from variations in load on the motor to thus maintain a predetermined speed of rotation of said motor.

It is still another specific object to provide an arrangement of the above character incorporating an adjustable flow orifice to thus predetermine the rate of rotation of said hydraulic motor.

It is a further object to provide an arrangement of the present character particularly adapted for the purpose of driving an endless conveyor and manually controlling the speed of travel of the conveyor and hence the pattern of the discharge or trajectory of the material leaving the discharge end of the conveyor.

Other objects, advantages and uses of the present invention will become apparent from reading the following specification and claims taken in connection with the appended drawings, wherein:

Fig. 1 is a schematic view showing a preferred embodiment of the present invention as applied to an endless conveyor;

Fig. 2 is an enlarged cross sectional view of the control valve assembly and brings out to advantage the relationship of the differential pressure responsive surfaces as well as the mode of coaction of the assembly;

Fig. 3 is a cross sectional view taken substantially on the line 3—3 of Fig. 2.

Figure 4:
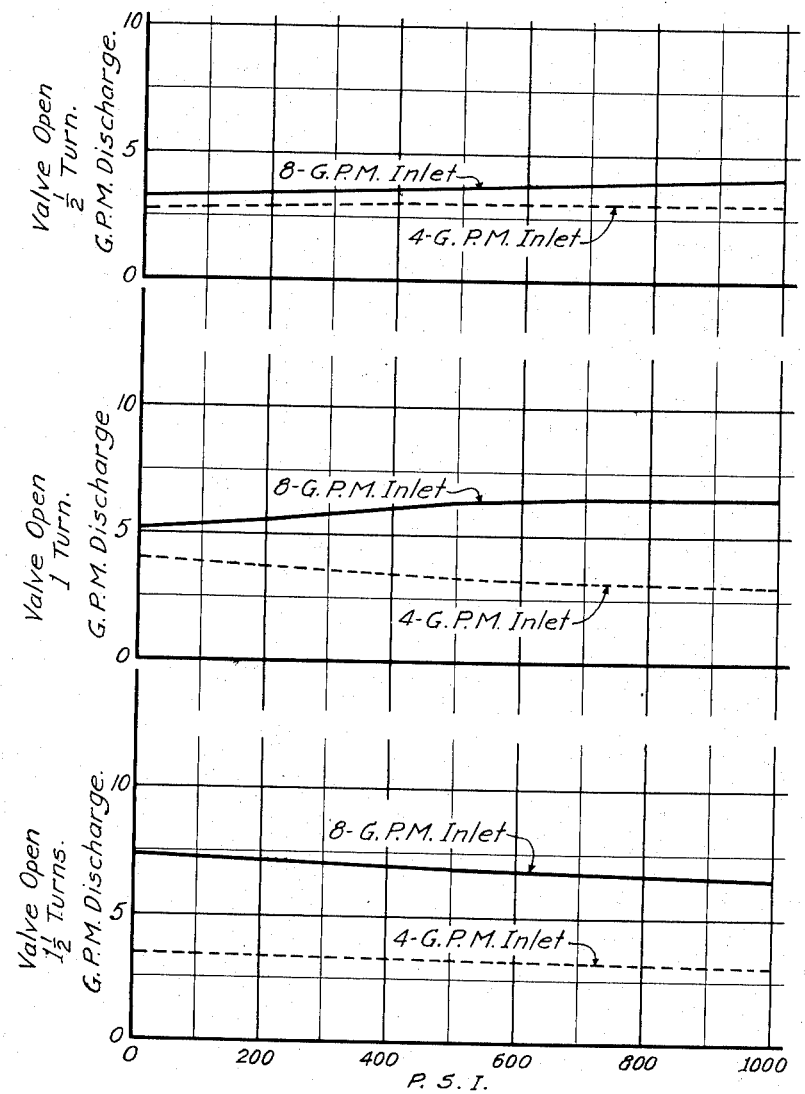
Fig. 4 presents a plurality of sets of curves bringing out clearly to particular advantage the mode of operation under representative conditions and showing the effective manner in which the present novel control assembly maintains substantially constant speed irrespective of varying load conditions.

Referring in greater detail to the figures of the drawings, the present invention has been illustrated by way of example as having particular application to the problem of driving an endless conveyor adapted to handle varying loads. It is not practical to always introduce a uniform amount of material at the inlet end of a loading conveyor, such as a coal conveyor, hence in previous arrangements the motor has had a tendency to drive the conveyor at varying speeds depending upon variations in the rate of loading of the conveyor. This results in an indeterminate shape of discharge trajectory that is not necessarily related to the pattern that is desired.

A conveyor indicated generally at 10 includes an endless belt 11 adapted to receive varying amounts of material such as coal 12 at the inlet end 11a thereof and discharge the same from the outlet end 11b thereof. The shapes of the trajectories 11c, 11d are determined by the speed of movement of the conveyor belt 11 and unless special provision is made thereof, these trajectories will vary with the rate of introduction on to the conveyor of the material being conveyed such as coal 12.

For the purpose of assuring that the conveyor 11 will travel at a selected rate of speed irrespective of variations in the loading, within the capacity range of the conveyor, there is provided a rotary intermeshing gear type motor M effective to drive the conveyor through a lower pulley 15. Liquid pressure generator G, preferably in the form of a constantly rotating intermeshing gear type pump, supplies driving power to motor M through a control valve assembly indicated generally at C. It is the particular arrangement of means constituting this control valve assembly C and the mode of coaction thereof in combination that comprises the particular subject matter to which the present invention is directed.

Liquid pressure generator G is preferably driven by a constantly rotating electric motor E, the liquid being circulated from the sump S and returned thereto either through the motor M or through by-pass line P.

Turning more specifically to Figs. 2 and 3, control valve assembly C comprises a housing 20 having an inlet passage 21 leading from the pressure generator G, a first outlet passage 22 leading to the pressure responsive motor M and a second outlet by-pass passage 23 leading to the sump. Interposed between the inlet 21 and the outlet 22 is a flow control orifice 24, having a manually adjustable valve 25 cooperating therewith for varying the size of the orifice. This orifice 24 is effective to produce a pressure drop between the inlet 21 and the outlet 22 which is taken advantage of in an important manner to automatically control the operation of the motor M to predetermine the rate of rotation thereof irrespective of variations in the loading of the conveyor. Valve 25 may be adjusted with reference to flow orifice 24 by any suitable means such as manually operable wheel 25a threadably received in housing 20 at 25b and having a guide piston 25c received in housing bore 20c.

It has been discovered that by providing suitable means for assuring that a predetermined rate of liquid pressure flow is directed to the motor M, due to the fixed displacement character thereof, this will result in maintaining the rate of rotation thereof substantially constant varying only with any small amount of slippage that may take place due to variations in the back pressure on the motor.

By-pass valve assembly indicated generally at 30 in combination with flow control orifice 24 is effective to perform this important function. By-pass valve 30 comprises a second orifice 24a adapted when open to place inlet 21 in communication with the second by-pass outlet 23 and thus reduce the rate of pressure liquid delivered through orifice 24 and to motor M. Particular attention is directed to the fact that by-pass valve 30 incorporates a reciprocable body or plunger 31 received in a housing bore 20a, the left hand terminal of the plunger 31 thereof having a second valve proper 32 adapted to cooperate with orifice 24a for either closing the same or opening the same in varying degrees under particular conditions that will appear. The right hand terminal of plunger 31 is in the form of a piston 33 placed in communication with the outlet 22 by passage 34. It is important to note that the pressure responsive surface area A-1 of valve 32 cooperating with orifice 24a, is given a selected value less than the surface area A-2 of piston portion 33, as will appear.

Therefore, it will be seen that any variations in the liquid pressure delivered from outlet 22 to motor M will be reflected to and act upon piston surface area A-2. The inlet pressure from the liquid pressure generator G, which remains substantially constant, acts on surface area A-1 with valve 32 in closed position. When, for example, motor M tends to speed up or increase its rate of rotation, this is evidenced by a drop in the pressure acting on surface area A-2 with the result that the pressure acting on surface area A-1 becomes effective to move by-pass valve 30 axially and by-pass a portion of the total generator output back to the sump through outlet 23 and conduit P. This has the effect of reducing the volume of pressure liquid delivered to the motor and hence reduces the speed thereof as the latter is directly proportional to the displacement of liquid passing therethrough.

Alternatively, if the loading on the conveyor is increased appreciably then the motor M will have a tendency to slow down causing a building up of the pressure on piston surface area A-2, a closing of valve 32 and hence the delivery of an increased proportion of or the entire output of the pressure generator G to the motor to thus cause the same to maintain its speed notwithstanding the increased work that it is called upon to do.

While the exact values of surface areas A-1 and A-2 may be effectively calculated, the same may also be readily arrived at by the method commonly known as "cut and trial." Starting with a selected size of bore 20a and plunger 31 and relatively small orifice 24a, it is a simple matter to gradually increase by increments the size of orifice 24a until the relationship between the area A-1 and the area A-2 produces the results desired.

As a further refinement, it has been found particularly effective to form the left hand terminal of plunger 31 forming valve 32 with a reduced cross sectional area to thus provide cylindrical portion 32a having a diameter of a size between the diameter of orifice 24a and the diameter of plunger 31, thereby resulting in the provision of a third pressure responsive area A-3. This surface area becomes effective upon the initial opening of valve 32 to accelerate the action thereof in moving the valve plunger into the opening direction. Bore 20a is also provided with a relatively enlarged annular recess 20b surrounding plunger 31, the left hand radial wall 35 of which cooperates with the terminal of surface area A-3, to perform a valving action.

Coil compression spring 36 functions to urge valve 32 in the seating direction with a selected force and may be confined within bore 20a by closure plug 37, which of course may be threaded if so desired for purposes of adjustment.

In addition there is provided a ball check valve 37 urged by coil compression spring 38 in the direction of its valve seat formed in bore 37a within plunger 31. Radial passages 39 formed in hollow plunger 31 communicate through the wide recess 20b with outlet port 23. This ball check valve 37 provides for return flow from outlet 22 to sump S in the event of excessive back pressure occurring.

Referring specifically to the several curves shown in Fig. 4, it will be seen that for representative conditions the motor M is made to turn at a substantially constant selected speed irrespective of variations in the output pressure from the control valve assembly, which corresponds, of course, to variations in the resistance to turning of the motor produced by variations in the loading of the conveyor. The particular speed at which it is desired to operate the motor is determined by the degree of opening of valve 25, the examples given being one-half; one; and one and one-half turns of valve 25 in the open direction. The pressure generator G was operated at two selected constant rates of speed in order to give a rate of flow of eight gallons per minute at the inlet for the first selected set of conditions as represented in the upper curve and later at a second rate of speed in order to give a flow of four gallons per minute to the inlet as represented in the lower curves. A flow valve was placed in communication with the outlet 22 for the purpose of varying the restriction of flow from outlet 22 and simulating the operation of the motor under conditions of varying load. It will be seen that notwithstanding variations in the resistance pressure of from 0 to 1,000# per square inch, there was little variation in the gallons per minute discharge through the outlet restrictor, thus indicating a substantially constant speed irrespective of variations in the resistance to flow from outlet 22.

While the present invention has been disclosed in connection with a material loading conveyor, it will be understood that this is by way of example and that the invention has broad application wherever an equivalent problem exists, and therefore the present invention is to be defined by the appended claims which should be given an interpretation consistent with the state of the prior art.

What is claimed is:

1. A working pressure liquid control valve effective to maintain a substantially constant driven motor speed from a substantially constant working liquid pressure source irrespective of variations in the load on the motor comprising, means defining a first orifice arranged to receive working pressure liquid and a second orifice arranged to direct working pressure liquid therefrom, a first throttling valve cooperating with said first orifice for regulating the rate of flow therethrough, manually adjustable means for determining the position of said first throttling valve, a third orifice for diverting varying portions of the total flow of pressure liquid from passing through said first orifice, a second throttling valve for regulating the liquid flow through said third orifice, said second throttling valve including a first pressure responsive surface in communication with the pressure liquid delivered to said first throttling valve tending to open said second throttling valve, a second pressure responsive surface in communication with the pressure liquid delivered through said first orifice beyond said first throttling valve tending to move said second throttling valve in a closing direction, said second pressure responsive surface having a larger area than said first pressure responsive surface, and a third pressure responsive surface in communication with said first pressure responsive surface upon partial opening of said second throttling valve and prior to the diversion of portions of the total flow through said third orifice to accelerate the opening action of said valve.

2. In a control valve for regulating the flow of working pressure liquid from a substantially constant source of pressure liquid to a pressure responsive motor to be supplied thereby to cause the motor to operate at substantially constant speed irrespective of variations in the resistance load encountered by said motor, an inlet orifice adapted to be connected to said source of pressure liquid and an outlet orifice adapted to be connected to said motor, means defining an adjustable orifice throttling valve arranged between said inlet orifice and said outlet orifice, means defining a by-pass valve including a by-pass orifice effective to divert varying portions of the liquid flow from passing through said throttling valve, said portions so diverted being related to the pressure in said outlet orifice, a first pressure responsive motive surface on said by-pass valve responsive to inlet pressure, a second pressure responsive motive surface on said by-pass valve responsive to outlet pressure, said second pressure responsive surface having a larger area than said first pressure responsive motive surface, and a third pressure responsive motive surface on said by-pass valve intermediate said first and second pressure responsive motive surfaces and intermediate said first pressure responsive motive surface and said by-pass orifice being placed in communication with said first pressure responsive motive surface upon partial opening of said valve effective to place said third pressure responsive motive surface in communication with inlet pressure prior to opening of said by-pass orifice whereby the opening action of said by-pass valve is accelerated.

3. In a control valve for regulating the flow of working pressure liquid from a source of constant liquid pressure to a pressure responsive motor to cause the motor to operate at a substantially constant speed irrespective of variations in the resistance load encountered by said motor, an inlet orifice adapted to receive inlet pressure from said source of liquid pressure, an outlet orifice adapted to discharge outlet pressure to said motor, means defining an adjustable orifice throttling valve arranged between said inlet orifice and said outlet orifice, means defining a by-pass valve including a by-pass orifice effective to divert varying portions of the liquid flow from passing through said throttling valve, said portions so diverted being related to outlet pressure, a first pressure responsive motive surface on said by-pass valve responsive to inlet pressure and arranged to move said valve to open position, a second pressure responsive motive surface on said by-pass valve responsive to outlet pressure and arranged to tend to hold said valve closed, and a third pressure responsive motive surface on said by-pass valve intermediate said first and said second surfaces and intermediate said first pressure responsive surface and said by-pass orifice and arranged to respond to inlet pressure upon said valve being partially opened effective to place said third pressure responsive surface in communication with said inlet pressure prior to opening of the by-pass orifice to accelerate the opening action of said valve.

4. In a control valve for regulating the delivery of working pressure to a pressure liquid responsive motor subject to variations in the working load thereon, means defining a first main orifice adapted to receive pressure liquid from said constant pressure liquid source and divert the same to said motor, a first throttling valve cooperating with said first orifice for regulating the size thereof, manually adjustable means for determining the position of said first throttling valve, means defining a second orifice for diverting varying portions of the flow of pressure liquid from passing through said first orifice, a by-pass orifice for diverting the flow of pressure liquid from said second orifice to sump, a second throttling valve for regulating the size of said second orifice and the flow therethrough, said second throttling valve comprising a reciprocable, plunger-like member having a valve proper at one terminal thereof movable in and away from the direction of the closure of said second orifice, said plunger including a piston-like pressure responsive portion, means placing said pressure responsive piston portion in communication with the pressure liquid delivered beyond said first orifice, said second orifice having a cross-sectional area less than the area of said piston surface, spring means normally urging said plunger-like valve member in the direction of said second named orifice, and a third portion on said plunger-like member, intermediate said valve proper and said piston-like pressure responsive portion and intermediate said valve proper and said by-pass orifice, arranged to respond to inlet pressure upon said valve proper being partially opened to accelerate the action of said plunger.

5. In a control member for regulating the delivery of working pressure liquid from a substantial constant pressure liquid source to a pressure liquid responsive motor subject to variations in the working load thereon whereby said motor will work at a substantial constant speed, means defining a first main orifice adapted to receive pressure liquid from said liquid source, a first throttling valve cooperating with said first orifice for regulating the size thereof, manually adjustable means for determining the position of said first throttling valve, means defining a second orifice and by-pass orifice for diverting varying portions of the flow of pressure liquid from passing through said first orifice, a second throttling valve for regulating the size of said second orifice and the flow therethrough, said second throttling valve comprising a reciprocable plunger-like member having a valve proper at one terminal thereof movable in and away from the direction of the closure of said second orifice, said plunger including a piston-like pressure responsive portion, and means placing said pressure responsive piston portion in communication with the pressure liquid delivered beyond said first orifice, said plunger-like valve being formed with pressure relief means therein to relieve the pressure delivered beyond said first orifice when the same rises above a predetermined selected value, said relief means including a passage through said plunger member having a valve port therein, a ball check valve engaging said port in the direction of flow from said motor, spring means normally urging said ball check valve in the direction of said port with a predetermined force, and a third portion on said plunger-like member, intermediate said valve proper and said piston-like pressure responsive portion, said third portion being so located with respect to said valve proper and said by-pass orifice that upon partial opening of said valve said third portion is placed in communication with inlet pressure prior to the opening of said by-pass orifice to accelerate the action of said plunger.

6. In a control valve for regulating the flow of working pressure liquid from a source of constant liquid pressure to a pressure responsive motor to cause the motor to operate at a substantially constant speed irrespective of variations in the resistance load encountered by said motor, an inlet orifice adapted to receive inlet pressure from said source of liquid pressure, an outlet orifice adapted to discharge outlet pressure to said motor, means defining an adjustable orifice throttling valve arranged between said inlet orifice and said outlet orifice, means defining a by-pass valve including a by-pass orifice effective to divert varying portions of the liquid flow from passing through said throttling valve, said portions so diverted being related to outlet pressure, a first pressure responsive motive surface on said by-pass valve and disposed directly in the path of flow of liquid from the inlet orifice to the outlet orifice, said first pressure responsive motive surface being responsive to inlet pressure and arranged to move said valve to open position, a second pressure responsive motive surface on said by-pass valve responsive to outlet pressure and arranged to tend to hold said valve closed, and a third pressure responsive motive surface on said by-pass valve intermediate said first and said second surfaces and intermediate said first pressure responsive surface and said by-pass orifice and arranged to respond to inlet pressure upon said valve being partially opened effective to place inlet pressure in communication with said third pressure responsive motive surface prior to the opening of said by-pass orifice to accelerate the opening action of said valve.

7. In a control valve for regulating the flow of working pressure liquid from a substantially constant source of pressure liquid to a pressure responsive motor to be supplied thereby to cause said motor to be operated at a substantially constant speed irrespective of variations in the resistance load encountered by said motor, including an inlet orifice adapted to receive inlet pressure and an outlet orifice adapted to discharge outlet pressure, means defining an adjustable orifice throttling valve arranged between said inlet orifice and said outlet orifice, means defining a by-pass valve including a by-pass orifice effective to divert varying portions of the liquid flow from passing through said throttling valve, said portions so diverted being related to the pressure in said outlet orifice, a first pressure responsive motive surface on said valve responsive to inlet pressure, a second pressure responsive motive surface on said valve responsive to outlet pressure, said second pressure responsive surface having a larger area than said first pressure responsive surface, and a third pressure responsive motive surface on said valve intermediate said first and second pressure responsive motive surfaces and intermediate said first pressure responsive surface and said by-pass orifice being placed in communication with said first pressure responsive motive surface upon partial opening of said valve effective to respond to inlet pressure prior to the opening of said by-pass orifice to accelerate the action of the valve, said first pressure responsive surface being disposed in the inlet pressure so as to present to said inlet pressure a greater area upon partial opening of said valve, said valve having a passage communicating with said outlet pressure, and a relief valve disposed in said passage and arranged to open in response to said outlet pressure upon said outlet pressure exceeding a predetermined value.

JOHN A. KANUCH.

References Cited in the file of this patent
UNITED STATES PATENTS

| Number | Name | Date |
|---|---|---|
| 1,804,751 | Doble | May 12, 1931 |
| 1,964,616 | Willson | June 26, 1934 |
| 2,057,088 | De Millar | Oct. 13, 1936 |
| 2,102,865 | Vickers | Dec. 21, 1937 |
| 2,354,634 | Griswold | July 25, 1944 |
| 2,388,820 | Bonnell | Nov. 13, 1945 |
| 2,440,961 | Link | May 4, 1948 |